United States Patent [19]

Weigt

[11] 4,339,013

[45] Jul. 13, 1982

[54] MOBILE AND ADAPTABLE WHEEL CHAIR

[76] Inventor: Gerald I. Weigt, 2530 Loyola Dr., Davis, Calif. 95616

[21] Appl. No.: 148,793

[22] Filed: May 12, 1980

[51] Int. Cl.[3] .......................... B62D 11/04; A47C 7/50; A47C 1/02

[52] U.S. Cl. .............................. 180/6.5; 280/242 WC; 297/354

[58] Field of Search .................... 180/6.5, DIG. 3, 74; 16/44; 297/DIG. 4, 355, 354, 391, 433, 436, 417; 280/DIG. 11, 242 WC, 289 WC, 5.28, 6 H, 721, 47.4, 47.41, 43.23, 43.18

[56] References Cited

U.S. PATENT DOCUMENTS

| | | | |
|---|---|---|---|
| 839,624 | 12/1906 | McNeill | 280/43.18 |
| 2,227,875 | 1/1941 | Boden | 16/44 |
| 3,112,001 | 11/1963 | Wise | 180/6.5 |
| 3,191,990 | 6/1965 | Rugg | 297/DIG. 4 |
| 3,342,505 | 9/1967 | Diehl | 280/721 |
| 3,406,772 | 10/1968 | Ahrent | 180/74 |
| 3,450,221 | 6/1969 | Nelson | 280/43.18 X |
| 3,786,887 | 1/1974 | Rosenthal | 180/74 |
| 3,826,324 | 7/1974 | Stevens | 280/DIG. 11 |
| 3,858,938 | 1/1975 | Kristensson | 297/433 |
| 3,893,529 | 7/1975 | Karchak | 180/74 |
| 3,917,312 | 11/1975 | Rodaway | 297/DIG. 4 |
| 3,968,991 | 7/1976 | Maclaren | 297/DIG. 4 |

*Primary Examiner*—Joseph F. Peters, Jr.
*Assistant Examiner*—Randall A. Schrecengost
*Attorney, Agent, or Firm*—Melvin R. Stidham

[57] ABSTRACT

A wheel chair, including a frame, with the rear wheels mounted independently, each on an elongated arm, which extends rearward from a torsion bar. The center of the torsion bar is normally gripped against rotation to prevent transmittal of torsion from one end of the bar to the other, but the torsion bar may be turned through an arc to raise and lower the rear wheels, so as to maintain the chair level when going up or down a grade. A leg support panel is mounted on a linkage to enable it to pivot about an axis corresponding to the knee axis of the patient and the back support pivots between upright and horizontal position generally about the hip axis of the person. A padded support extends upward when the back support is lowered from its erect position in order to maintain continued support of the head.

15 Claims, 10 Drawing Figures

MOBILE AND ADAPTABLE WHEEL CHAIR

BACKGROUND OF THE INVENTION

Many wheel chairs in use today subject the users to unnecessary and often severe physical punishment. The wheels are generally mounted directly on the frame so that any bump or depression impacted by either wheel is delivered through the frame to the rider. Over years of use, this often results in compacting the spinal column.

Some existing wheel chairs provide some limited adjustment to the back and leg supports but it is not believed that there exists a wheel chair capable of supporting a patient in any selected position between upright and horizontal; and it is not believed that there is a wheel chair which is capable of allowing the user to lie prone thereon for a nap.

OBJECTS OF THE INVENTION

It is an object of this invention to provide a wheel chair that allows little or no road shock, which may be encountered by a wheel to be transmitted to the chair itself.

It is further object of this invention to provide a wheel chair that enables each wheel to absorb road impact without transmitting same to the other wheel.

It is a further object of this invention to provide a wheel chair that is capable of supporting the patient's back in any selected position between upright and horizontal.

It is a further object of this invention to provide a wheel chair which is capable of supporting the legs of a person in any selected position between upright and horizontal.

It is a further object of this invention to provide a wheel chair with a leg support that swings through selected positions about an axis corresponding generally with the user's own knee axis.

It is a further object of this invention to provide a wheel chair having a back support which swings through selected positions about an axis corresponding generally to the user's own hip axis.

It is a further object of this invention to provide a wheel chair having a back support which is capable of being pivoted from a normal erect position to a selected inclined position, while supporting the user's head in any position back from upright position.

It is a further object of this invention to provide a motorized wheel chair that is easy to handle and is highly maneuverable.

Other objects and advantages of this invention will become apparent from the description to follow, particularly when read in conjunction with the accompanying drawings.

SUMMARY OF THE INVENTION

In carrying out this invention, I provide a wheel chair wherein each rear wheel is driven independently in either direction by direct engagement of a motor-driven gear with the tread of the rubber tire. A series of hydraulic rams easily controlled by a joy stick switch at the hand of the user are operated selectively to pivot the back support about an axis corresponding generally to the hip of the user and a leg support about an axis corresponding generally to the knee axis of the user. The front "follower wheels" are free to pivot to adapt to the direction of movement and are spring mounted for a limited shock absorbing action. The main rear driving wheels are mounted on elongated cantilever beams which are secured to a torsion bar, which in turn is rotatably mounted at the forward end of the frame. However, the center of the torsion bar is gripped against rotation so that any road impact encountered by one wheel can not be transmitted completely along the length of the torsion bar to the other wheel. Hence, each wheel is mounted independently in shock absorbing suspension. The arm that normally holds the center of the torsion bar against rotation may be pivoted to turn the bar through a limited arc to raise and lower the back wheels so that the seat may be maintained generally horizontal on either upgrades or downgrades. When the back rest is moved from its upright position, spring means are released to extend a head support to ensure cushioned support of the head in any position out of upright position. Arm rests may be lowered from their normal upright position to facilitate side access to the wheel chair.

DESCRIPTION OF A PREFERRED EMBODIMENT

The Wheel Chair

Figure 1:
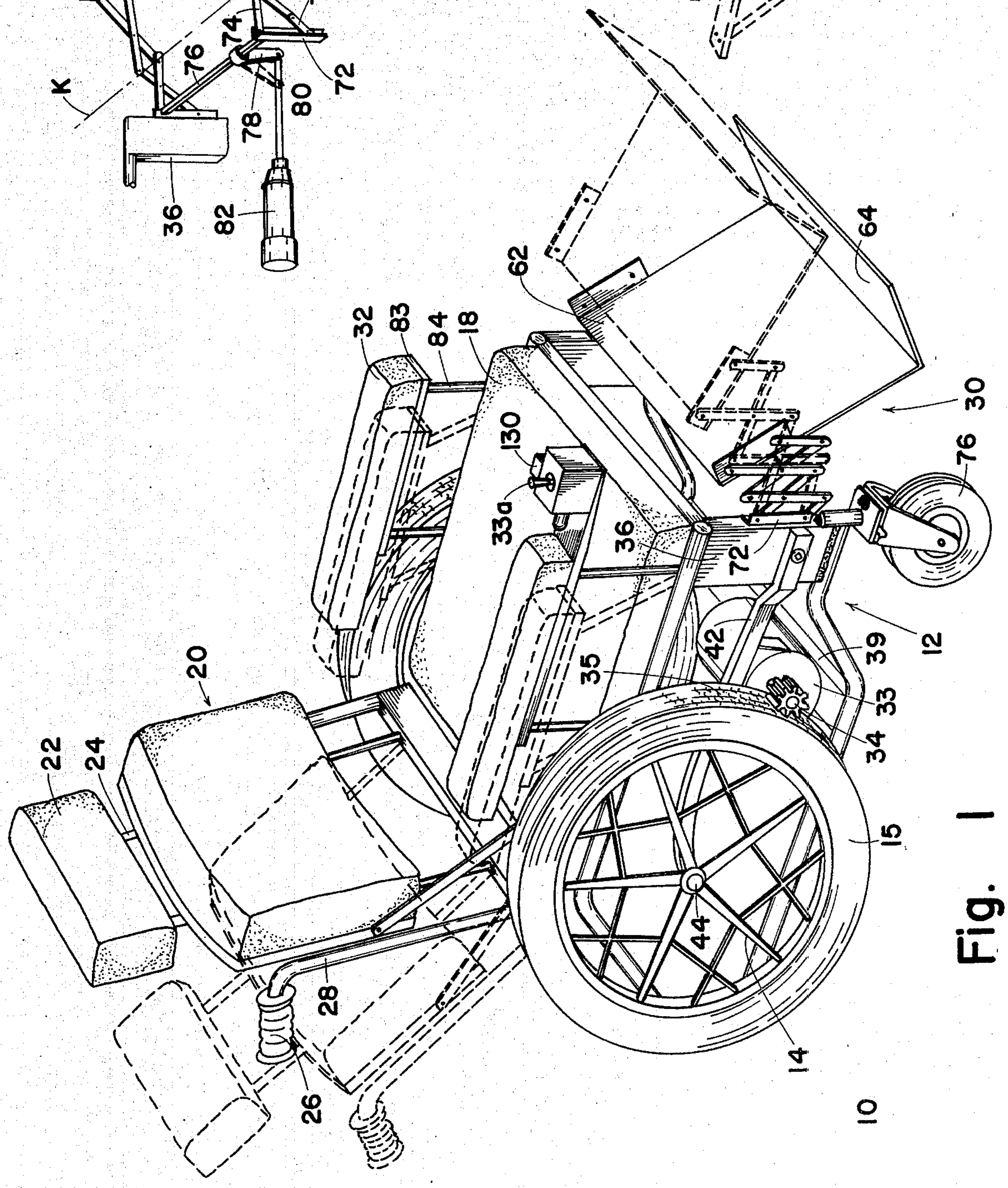
FIG. 1 is a front side view in perspective of the wheel chair of this invention, showing in phantom several selected positions of the components thereof.
Figure 9:
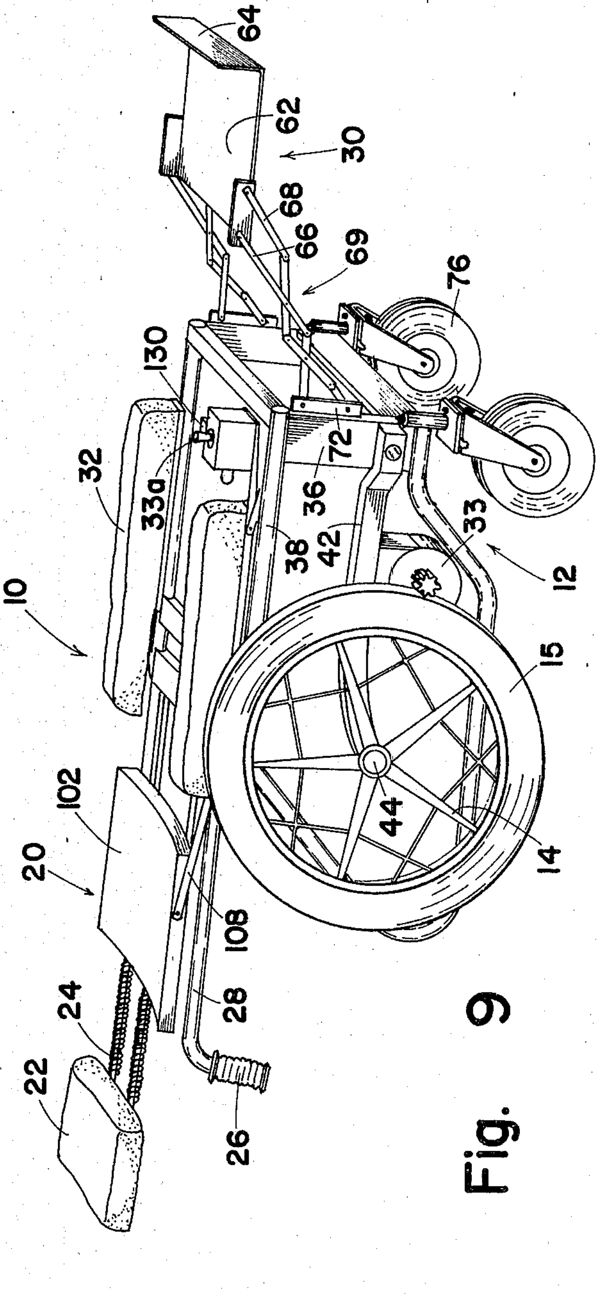
FIG. 9 is a view of the wheel chair in perspective in its horizontal mode.

Referring now to FIG. 1 with greater particularity, the wheel chair of this invention includes a frame 12 mounted on main drive wheels 14 with tires 15, as well as small front wheels 16. Carried on the frame 12 is a seat 18 and a back support assembly 20, which as indicated in phantom, may be pivoted back from an upright position shown in solid lines to a substantially horizontal position (FIG. 9). A head support 22, which is carried on posts 24 is normally depressed as shown in solid lines so as not to obstruct the vision of the patient as he looks back over his shoulder. However, when the back support 20 is moved from its horizontal position the head support is raised, as shown in phantom, to support the head while the patient is lying prone. Handgrips 26 carried on posts 28 which are part of the back support assembly 20 enable the wheel chair 10 to be pushed by an attendent, if desired. For this purpose, suitable clamping means or the like may be provided to disengage the motor drive.

A leg and foot support assembly 30 is mounted to be rotated from its normal upright position when the patient is in sitting position to a substantial horizontal position when the patient is prone. In addition, arm rests 32 are movable as indicated from an upright position shown on solid lines to a depressed position wherein, a patient lying prone on the wheel chair 10 in horizontal configuration (FIG. 9) may be rolled off onto a bed.

Each rear wheel 14 is driven from a motor 33 through a relatively wide gear 34 that engages the rubber tread 35 of the tires 15. The direction of drive for each wheel may be under the control of a "joy stick" type switch 33*a*.

The Suspension Mounting

Referring now to FIGS. 2 through 5, the frame 12 of the wheel chair may include a pair of rigid posts 36 to each of which are secured the opposite ends of a generally horizontal, elongated u-shaped tubular cantilever beam 38, the beams being secured together by cross braces 39 rotatably carried in the rigid posts 36, is a torsion bar 40, preferably encased in a sleeve 41 at the opposite ends of which are splined or otherwise secured a pair of rearwardly extending cantilever beams 42. At the trailing ends of the beams 42 are axles 44 for rotatably mounting the rear, drive wheels 14.

The center of the torsion bar 40 is gripped by an actuating arm 46 which, in turn, is pivotally mounted at the end of a piston rod 48 reciprocable in a hydraulic ram 50 mounted on the frame 12. In normal operation, the piston rod 48 is fixed so that the center of the torsion bar is held against rotation. Thus, any torsion delivered at one end thereof is not transmitted to the other. Hence, one wheel 14 of the wheel chair 10 can impact a bump or depression and the shock will be absorbed in the torsion bar 40, without delivering similar torsion to the other wheel 14. This provides greater stability and the absorption of the shock greatly improves the comfort of the ride.

With the drive motors 33 and pinions 34 mounted on the wheel support cantilever beams 42, drive to the wheels 14 is not interrupted by oscillation of the beams 42 as a result of road impacts.

Figure 4:
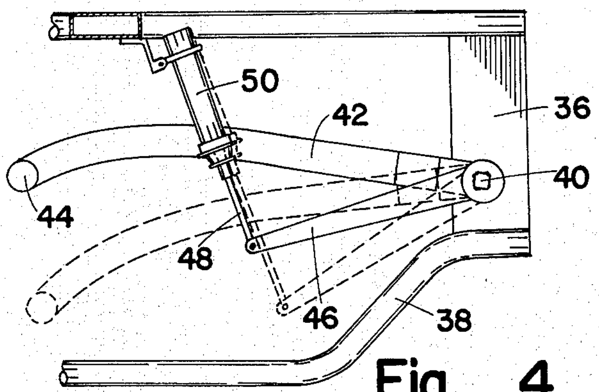
FIG. 4 is a partial view of the frame showing operation of the wheel adjustment means.
Figure 5:
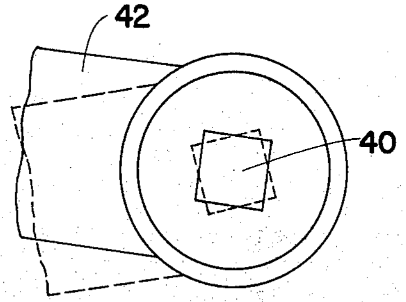
FIG. 5 is an enlarged partial view of the torsion bar wheel support mounting.
Figure 2:
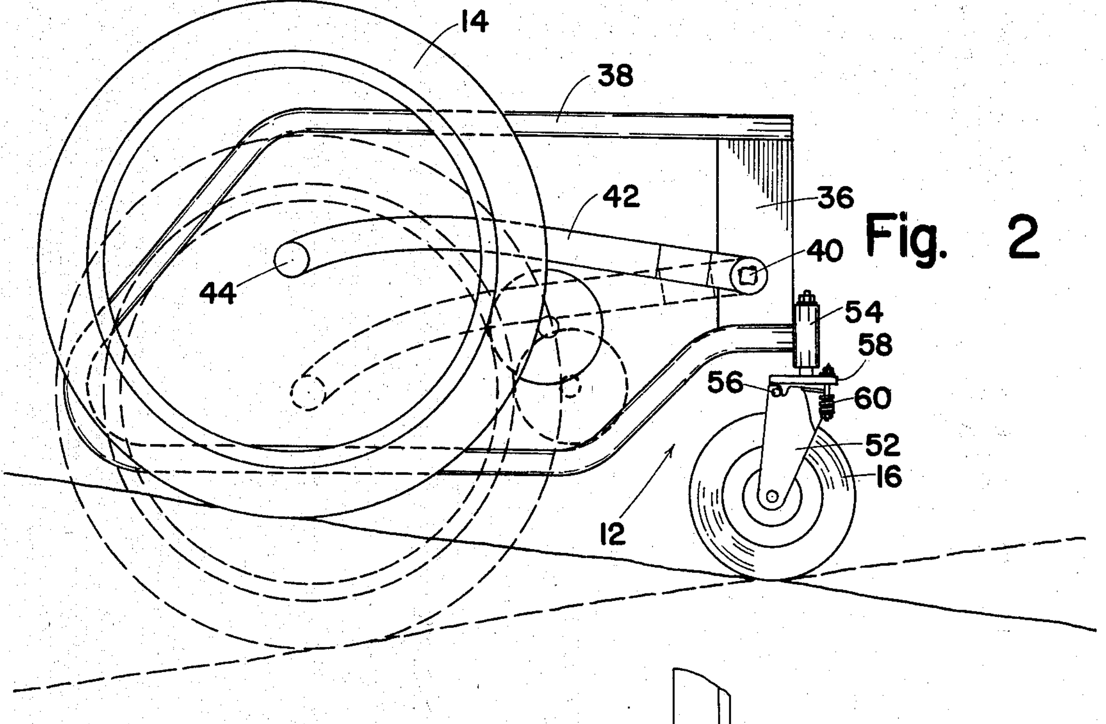
FIG. 2 is a partial side view of the vehicle frame showing operation of the main wheel mounting.
Figure 3:
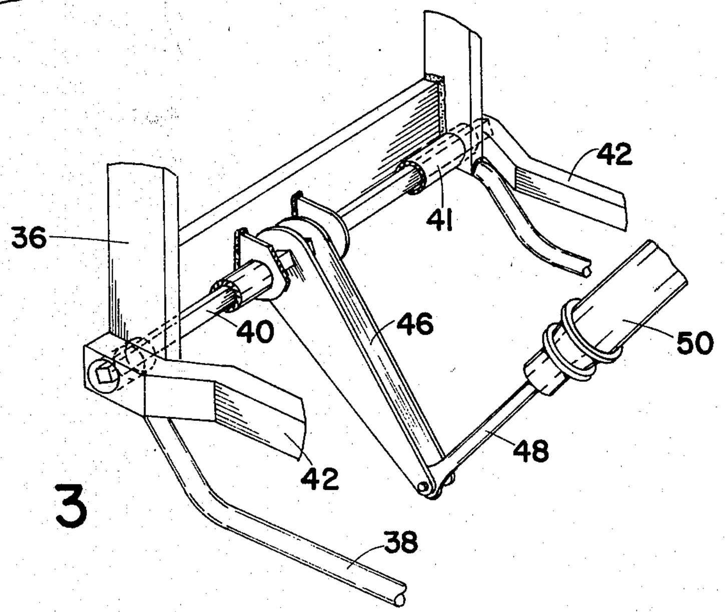
FIG. 3 is an enlarged partial view in perspective showing a portion of the wheel mounting.

When it is desired to adjust the wheel chair 10 to an upgrade or downgrade, the rear wheels 14 may be raised or lowered by retracting or extending the piston rod 48, as illustrated in FIGS. 2 and 4. For example, when moving down the isle of a theatre, the operator may wish to raise the rear drive wheels 14 to a level wherein the seat 18 is relatively horizontal. To do this, the hydraulic ram 50 is actuated to retract the piston rod 48, as indicated in solid lines in FIG. 4. This turns the torsion bar 40 clockwise in FIG. 4, and pivots the cantilever suspension beams 42 upward. This action may be reversed to go back up the aisle.

At the front of the frame 12 the small wheel 16 is rotated in a yoke 52 which is free to pivot in a bearing 54. The yoke 52 is pivoted to a base plate 58 and is spring mounted at 60 to further cushion the ride.

The Leg and Foot Support Assembly

Figure 6:
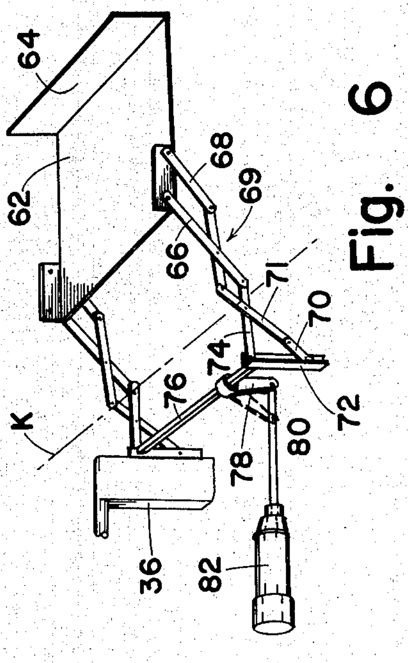
FIG. 6 is a partial view in perspective showing the operation of the leg support mechanism.

Referring now to FIGS. 1 and 6, the leg and foot support assembly 30 has a panel 62 to support the backs of the legs when in raised position and a foot rest 64. The panel 62 is pivotally mounted on the ends of two links 66 and 68 at the end of scissors type, extensible linkage 19, which at the near end includes a link 70 which is pivoted to a link 71 and to bracket 72, secured to the rigid post 36 of the frame. Scissored with link 71 is a link 74 which is secured on the end of a shaft 76 to rotate therewith. Hence, when the shaft 76 is turned counterclockwise, the link 74 is pivoted upward carrying the link 71 with it and, thereby, extending the entire scissors linkage 69.

The scissors linkage 69 is designed so that the panels 62 swings, not about the axis of the shaft 76 but about an axis K displaced upward therefrom and corresponding generally to the axis of the patient's knee. Hence, the panel 62 can be raised without changing the location of the foot rest 64, or any other part of the panel 62 relative to the patient's legs.

An arm 78 secured to the shaft 76 is pivoted to a piston rod 80 carried in a hydraulic ram 82, which is selectively operated to raise, and lower the platform 62 as described.

The Arm Support System

Figure 7:
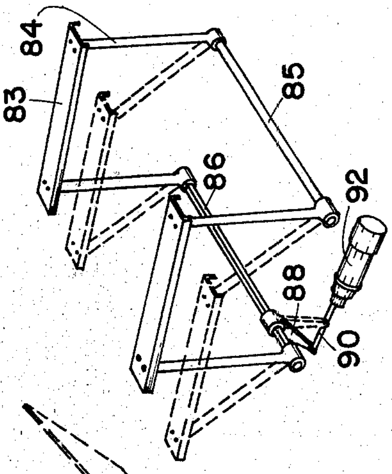
FIG. 7 is a partial view in perspective showing operation of the arm rest mechanism.

Referring now to FIGS. 1 and 7, the arm rests 32 are supported on plates 89 which, in turn, are pivotally mounted at the tops of posts 84. The posts 84 are secured to front and rear shafts 85 and 86 which are rotatable on the frame 12. Thus, the posts 84 and plates 83 together form a parallelogram structure to pivot together. An arm 88 carried on one of the shafts 86 is pivotally secured to the end of a piston rod 90 which is driven by a hydraulic ram 92. Hence, when the hydraulic ram is operated to retract the piston rod 90, the arm 88 moves to the position shown in phantom to pivot the arms down and bring the arm rests 32 to depressed positions at or below the level of the seat 18 to enable side entry to the wheel chair 10.

The Back Support Assembly

Figure 8:
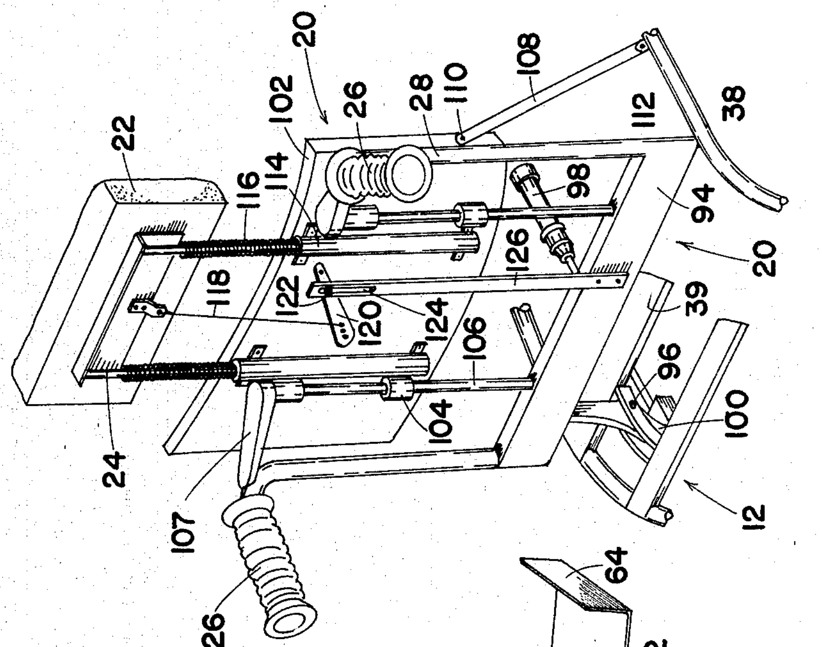
FIG. 8 is a rear view in perspective showing components of the back support system.
Figure 10:
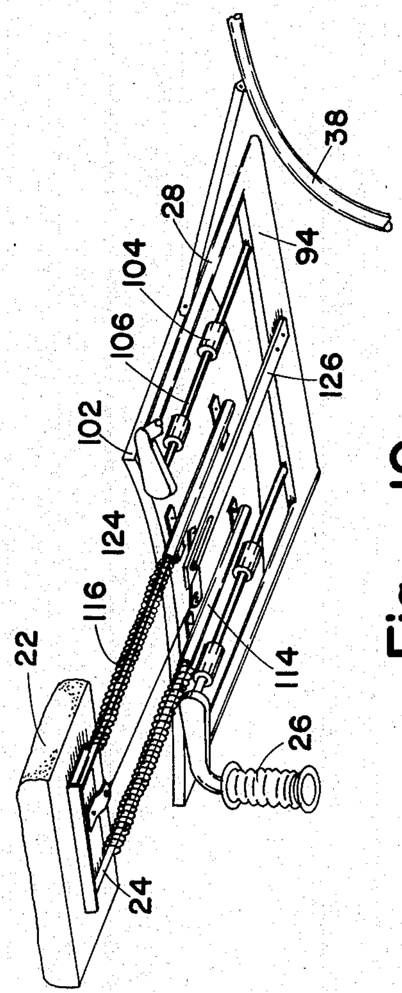
FIG. 10 is a view in perspective from behind and below the back support showing operation of the head support device.

Referring now to FIGS. 8 to 10 the back support assembly 20 includes a rigid sub-frame 94, which includes the upright posts 28 which carry the hand grips 26. The sub-frame 94 is pivoted at 96 about the vehicle frame 12 and is adapted to be pivoted to a selected position by operation of the hydraulic ram 98 which is pivoted to a depending arm 100 on the sub-frame 94.

Secured to the back side of the back support 102 are two series of sleeves or bushings 104, which are slidable on verticle posts 106, which are secured at their lower ends to the sub-frame 94, and at their upper ends to cross braces 107 welded to the hand grip posts 28.

A link 108 is pivoted between the back support 102 and the vehicle frame member 38 so that as the back rest assembly swings back, the back support 102 is pulled to slide down the rods 106 and maintain the same position relative to the pivot 112 on the vehicle frame member 38. This is designed to cause the back rest 102 to swing approximately about the hip axis of the patient, so that the back support 102 remains relatively fixed with respect to the patients back being supported. Hence, the chair can be designed to provide optimum back support for the particular patient and such support remains relatively fixed throughout movements of the back support assembly 20.

The Head Rest

Referring to FIGS. 8 and 10, the padded head rest 22 is, as previously described, carried on a pair of posts 24 which are slidably carried in sleeves 114 secured to the back of the back support 102.

In upright position, the head support 22 is held in its lower, retracted position against the action of springs 116 by means of a suitable tension member 118 which is pulled down by lever 120 pivoted on the back of the back support 102. The lever is in turn normally held in its lower position by engagement of a pin 122 thereon against the top of a slot 124 at the upper end of a bar 126 which is secured at 128 to the sub frame 94.

In operation, as the back support sub frame is pivoted back from the position shown in FIG. 8, the back support 102 is pulled down the rods 106 so that the pin 122 on lever 120 tends to slide down the slot 124. During initial movement of the back assembly 120 this movement is taken up by the springs 116 and, with the pin 122 located on the lever 120 so that the end of the lever moves through an arc of about twice the length, considerable movement of the wire 118 and head rest is enabled in the first increment of movement of the subframe 94. Accordingly, the head rest 122 is immediately projected to its extended position to give maximum support to the head throughout movement of the back support 122.

As illustrated particularly in FIG. 9 when the back support assembly is moved to its lowered position, the leg support assembly may also be raised to horizontal position, or anywhere intermediate, and the patient may take a nap directly on the wheel chair. If it is desired to move the patient to a bed, the arm rests 32 may be depressed to their lower positions shown in FIG. 9 and the patient lifted or rolled directly onto the bed.

When it is desired to return the patient to upright position from prone position on the chair 10, the hydraulic ram 98 is again actuated to raise the back rest, and the ram 82 (FIG. 5) is operated to swing the leg support down. These operations may be done simultaneously, but the control switch is preferably conditioned to enable only one mode change at a time in order to lessen the likelihood of the patient becoming disoriented.

In any event, as the back support assembly 20 approaches its upright position, the pin 22 will have reached the top of the slot 124 and, thereafter, the pull bar 126 will commence to pull the lever 120 down to retract the head rest 22, again at about a 2 to 1 ratio, against the action of the springs 116. With the headrest so retracted the patient can look back over his shoulders with view unobstructed.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. A wheel chair comprising:
- a frame;
- a transverse torsion bar rotatably mounted near its ends on the forward portion of said frame;
- a pair of rearwardly extending, elongated wheel support arms non-rotatably mounted on the ends of said torsion bar;
- a rear wheel rotatably mounted at the trailing end of each of said wheel support arms;
- a control arm non-rotatably secured to the mid-portion of said torsion bar; a hydraulic ram pivoted between said control arm and said frame so that the position of the piston in said hydraulic ram will determine the angular disposition of said wheel support arms, and said hydraulic ram when set holds said mid-portion against rotation, so that torsion at one end of said torsion bar is not transmitted to the other end thereof; and
- at least one front wheel rotatably mounted at the forward end of said frame.

2. The vehicle defined by claim 1 including:
- a rotary motor mounted on each of said elongated wheel support arms;
- a gear driven by each of said motors; and
- a resilient tire on each of said rear wheels engaged so as to be driven by one of said gears.

3. A wheel chair comprising:
- a frame;
- at least one front wheel and a pair of rear wheels rotatably mounted on said frames;
- a seat supported on said frame;
- a back-support carried at the rear of said frame;
- a leg support panel at the forward end of said frame;
- a transverse leg support shaft rotatably mounted on the forward end of said frame;
- a pair of extensible linkages, each including two adjacent pivoted links, one secured to said leg support shaft to rotate therewith and the other pivoted to the forward end of said frame, and two remote links pivoted at one pair of adjacent ends to said adjacent links and at the other pair of adjacent ends to a side of said support panel so that when said leg support shaft is turned upward, said linkage is extended to pivot said panel about a transverse axis located above said shaft; and means for turning said shaft partially in either direction.

4. The wheel chair defined by claim 3 wherein said back-support comprises:
- a pair of posts pivoted at their lower ends to the rear end of said frame;
- a back-support panel slidable on said posts; and
- a restraining link pivoted at opposite ends to said frame and said back-support panel so that said back-support panel remains at a fixed distance from approximately the user's hip axis throughout pivotal movement of said posts; and
- means for pivoting said posts between upright and generally horizontal positions.

5. The wheel chair defined by claim 4 including:
- a head support;
- complementary upright slides and slideways on said head support and back support respectively;
- spring means biasing said head support toward an elevated position;
- a latch operative to hold said head support in retracted position; and
- means operative to release said latch when said posts are moved from their upright positions.

6. The wheel chair defined by claim 4 including:
- a head support;
- a pair of elongated slide members secured to said head support to depend therefrom;
- a pair of slideways on said back-support panel slidably receiving said slide members;
- compression springs biasing between said head support and said back-support panel;
- a lever pivoted on said back-support panel to swing between a normal depressed to an elevated position;
- a tension member secured to the free end of said lever;
- a pin intermediate the length of said lever;

a pull rod attached at its lower end to said posts to pivot therewith; and a longitudinal slot near the upper end of said slot receiving said pin.

7. The wheel chair defined by claim 3 including:

a pair of spaced arm support posts; and means operative to pivot said support posts between upright, elevated positions and generally horizontal, lower positions to facilitate removal of a person from the chair onto a horizontal support.

8. The wheel chair defined by claim 3 including:

a transverse torsion bar rotatably carried at the forward portion of said frame;

a pair of elongated, rearwardly extending wheel support arms non-rotatably mounted on the ends of said torsion bar;

a rear wheel rotatably mounted at the trailing end of each of said wheel support arms; and at least one front wheel rotatably mounted at the forward end of said frame.

9. The vehicle defined by claim 8 including:

means on said frame gripping the mid-portion of said torsion bar against rotation so that torsion at one end of said bar is not transmitted to the other end thereof.

10. The vehicle defined by claim 9 wherein:

said gripping means include a control arm secured to said torsion bar; and a reciprocable, force-delivering member pivoted to the end of said control arm so that operation thereof turns said torsion bar to swing said wheel support arms selectively up and down.

11. The wheel chair defined by claim 8 including:

tires with treads thereon on said rear wheels;

a rotary drive on each of said wheel support arms; and a drive gear driven by each of said rotary drives and engaging one of said rear wheels.

12. A wheel chair comprising:

a frame;

front and rear wheels rotatably mounted on said frame;

a seat support on said frame;

a back-support carried at the rear of said frame comprising:

a pair of posts pivoted at their lower ends to the rear end of said frame;

a back-support panel slidable on said posts; and a restraining link pivoted at opposite ends to said frame and said back-support panel so that said back-support panel remains at a fixed distance from approximately the user's hip axis throughout pivotal movement of said posts; and means for pivoting said posts between upright and generally horizontal positions.

13. The wheel chair defined by claim 12 including:

a head support;

complementary upright slides and slideways on said head support and back support respectively;

spring means biasing said head support toward an elevated position;

a latch operative to hold said head support in retracted position; and means operative to release said latch when said posts are moved from their upright positions.

14. The wheel chair defined by claim 12 including:

a head support;

a pair of elongated slide members secured to said head support to depend therefrom;

a pair of slideways on said back-support panel slidably receiving said slide members;

compression springs biasing between said head support and said back-support panel;

a lever pivoted on said back-support panel to swing between a normal depressed to an elevated position;

a tension member secured to the free end of said lever;

a pull rod attached at its lower end to said posts to pivot therewith; and a longitudinal slot near the upper end of said slot receiving said pin.

15. The wheel chair defined by claim 12 including:

a pair of spaced arm support posts pivotally mounted on each side of said frame;

an arm rest spanning said support posts; and means operative to pivot said support posts between upright, elevated positions and generally horizontal, lower positions to facilitate removal of a person from the chair onto a horizontal support.

* * * * *